United States Patent
Misaki et al.

(10) Patent No.: US 10,153,080 B2
(45) Date of Patent: Dec. 11, 2018

(54) REACTOR

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka (JP)

(72) Inventors: Takashi Misaki, Mie (JP); Shinichirou Yamamoto, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka (JP)

( * ) Notice: Subject to any disclaimer, the term of this patent is extended or adjusted under 35 U.S.C. 154(b) by 52 days.

(21) Appl. No.: 15/307,676

(22) PCT Filed: Apr. 17, 2015

(86) PCT No.: PCT/JP2015/061897
§ 371 (c)(1),
(2) Date: Oct. 28, 2016

(87) PCT Pub. No.: WO2015/170571
PCT Pub. Date: Nov. 12, 2015

(65) Prior Publication Data
US 2017/0053731 A1 Feb. 23, 2017

(30) Foreign Application Priority Data

May 7, 2014 (JP) .................... 2014-096413

(51) Int. Cl.
*H01F 27/02* (2006.01)
*H01F 27/30* (2006.01)
(Continued)

(52) U.S. Cl.
CPC ......... *H01F 27/2895* (2013.01); *H01F 27/02* (2013.01); *H01F 27/06* (2013.01);
(Continued)

(58) Field of Classification Search
CPC ........ H01F 27/22; H01F 27/263; H01F 37/00; H01F 27/06
(Continued)

(56) References Cited

U.S. PATENT DOCUMENTS 3,268,686 A * 8/1966 Wauer .................. H01H 51/281
 335/154
4,047,061 A * 9/1977 Kilmer ...................... H02K 1/12
 206/398

(Continued)

FOREIGN PATENT DOCUMENTS

JP 2006135018 A 5/2006
JP 2006294830 A 10/2006
(Continued)

Primary Examiner — Alexander Talpalatski
Assistant Examiner — Joselito Baisa
(74) Attorney, Agent, or Firm — Honigman Miller Schwartz and Cohn LLP (57) ABSTRACT

Provided is a reactor exhibiting stable magnetic characteristics. The reactor includes a coil, a magnetic core having an inner core portion and an outer core, and an end surface connecting member disposed between an end surface of the winding portion and the outer core portion. The reactor includes a resin-molded portion integrates integrating the outer core portion and the end surface connecting member, and a plurality of protruding portions provided disposed on an outer surface of the end surface connecting member on which the outer core portion is disposed and that supports the outer core portion at a distance from the outer surface, the resin-molded portion enters a gap formed between the outer surface and the outer core portion by the protruding portions, thereby forming a resin gap between the inner core
(Continued)

portion and the outer core portion are being separated from each other by the end surface connecting member.

12 Claims, 7 Drawing Sheets

(51) Int. Cl.
| | |
|---|---|
| *H01F 27/28* | (2006.01) |
| *H01F 37/00* | (2006.01) |
| *H01F 27/245* | (2006.01) |
| *H01F 27/255* | (2006.01) |
| *H01F 27/26* | (2006.01) |
| *H01F 27/32* | (2006.01) |
| *H01F 27/06* | (2006.01) |
| *B60L 11/18* | (2006.01) |
| *H01F 27/08* | (2006.01) |
| *H02P 27/06* | (2006.01) |

(52) U.S. Cl.
CPC ......... *H01F 27/245* (2013.01); *H01F 27/255* (2013.01); *H01F 27/263* (2013.01); *H01F 27/323* (2013.01); *H01F 27/327* (2013.01); *H01F 37/00* (2013.01); *B60L 11/1803* (2013.01); *H01F 27/08* (2013.01); *H02P 27/06* (2013.01)

(58) Field of Classification Search
USPC .............................. 336/90, 92, 205, 208, 221
See application file for complete search history.

(56) References Cited

U.S. PATENT DOCUMENTS

| | | | | | |
|---|---|---|---|---|---|
| 4,843,362 | A | * | 6/1989 | Heritier-Best | ........ H01F 27/022 336/178 |
| 5,439,320 | A | * | 8/1995 | Abrams | .................... E21B 7/30 405/184 |
| 5,477,203 | A | * | 12/1995 | Sawazaki | ................. H01F 38/12 336/178 |
| 5,977,855 | A | * | 11/1999 | Matsumura | ........... H01F 27/365 336/192 |
| 6,710,503 | B2 | * | 3/2004 | Yamawaki | ............. H02K 1/145 310/257 |
| 6,771,157 | B2 | * | 8/2004 | Nishikawa | ................ H01F 3/14 336/178 |
| 6,897,592 | B2 | * | 5/2005 | Suzuki | ................... H02K 3/525 310/194 |
| 7,508,293 | B2 | * | 3/2009 | Groezinger | ............... H01F 3/10 336/234 |
| 8,416,046 | B2 | * | 4/2013 | Yoshikawa | ............. H01F 37/00 336/180 |
| 8,723,505 | B2 | * | 5/2014 | Sakamoto | ............... B60R 16/02 324/117 H |
| 8,866,578 | B2 | * | 10/2014 | Yen | ....................... H01F 27/306 336/198 |
| 9,099,236 | B2 | * | 8/2015 | Nomura | ................. H01F 27/025 |
| 2008/0290979 | A1 | * | 11/2008 | Suzuki | ...................... H01F 5/02 336/192 |
| 2009/0108971 | A1 | * | 4/2009 | Okamoto | .............. H01F 27/266 336/65 |
| 2012/0194311 | A1 | * | 8/2012 | Suzuki | ................. H01F 27/266 336/92 |
| 2012/0223795 | A1 | * | 9/2012 | Hester | ...................... H01F 5/06 336/90 |
| 2013/0088317 | A1 | * | 4/2013 | Tawara | .................. H01F 17/06 336/212 |
| 2015/0043262 | A1 | | 2/2015 | Ito et al. | |

FOREIGN PATENT DOCUMENTS

| | | |
|---|---|---|
| JP | 2008028313 A | 2/2008 |
| JP | 2013135191 A | 7/2013 |
| WO | 2013125102 A1 | 8/2013 |

* cited by examiner

REACTOR

CROSS-REFERENCE TO RELATED APPLICATIONS

This application is the U.S. national stage of PCT/JP2015/061897 filed Apr. 17, 2015, which claims priority of Japanese Patent Application No. JP 2014-096413 filed May 7, 2014.

FIELD OF THE INVENTION

The present invention relates to a reactor used for a constituent component or the like of an in-vehicle DC-DC converter or a power conversion device installed in an electric vehicle such as a hybrid automobile.

BACKGROUND

Magnetic components, such as reactors and motors, that are provided with a coil having a winding portion formed by winding a wire and a magnetic core partially inserted in the inside of the winding portion are used in various fields. As such magnetic components, for example, JP 2013-135191A discloses a reactor used for a circuit component of a converter installed in an electric vehicle such as a hybrid automobile.

JP 2013-135191A discloses a reactor including a coil having a winding portion, and a ring-shaped magnetic core. The magnetic core is formed by connecting an inner core portion disposed inside the winding portion and an outer core portion disposed outside the winding portion into a ring shape. Also, JP 2013-135191A discloses a reactor obtained by combining a coil and a magnetic core and partially or entirely covering an outer circumference of the combined product with a resin-molded portion.

In the reactor disclosed in JP 2013-135191A, a frame-shaped bobbin (end surface connecting member) is disposed between an end surface of the winding portion of the coil and the outer core portion. Although a gap plate is disposed between the inner core portion and the outer core portion in JP 2013-135191A, in the case where a gap is to be formed using a molding resin, there is a possibility that filling of the molding resin between the inner core portion and the outer core portion may be insufficient. If insufficient filling occurs, an unwanted air gap may be formed between the outer core portion and the inner core portion, and there is a risk that a reactor that has stable magnetic characteristics cannot be obtained.

The present invention was made in view of the above-described circumstances, and it is an object thereof to provide a reactor that exhibits stable magnetic characteristics.

SUMMARY OF THE INVENTION

A reactor according to an aspect of the present invention is a reactor including a coil having a winding portion, a magnetic core having an inner core portion disposed inside the winding portion and an outer core portion disposed outside the winding portion, an end surface connecting member that is disposed between an end surface of the winding portion and the outer core portion, a resin-molded portion that integrates the outer core portion and the end surface connecting member, and a plurality of protruding portions that are provided on an outer surface of the end surface connecting member on which the outer core portion is disposed and that support the outer core portion at a distance from the outer surface, wherein the resin-molded portion enters a gap that is formed between the outer surface and the outer core portion by the protruding portions, thereby forming a resin gap between the inner core portion and the outer core portion that are separated from each other by the end surface connecting member.

According to the above-described reactor, the resin gap is formed between the inner core portion and the outer core portion, and thus stable magnetic characteristics are exhibited.

DETAILED DESCRIPTION OF THE PREFERRED EMBODIMENTS

First, aspects of the present invention will be listed and described.

A reactor according to an embodiment relates to a reactor including a coil having a winding portion, a magnetic core having an inner core portion disposed inside the winding portion and an outer core portion disposed outside the winding portion, and an end surface connecting member that is disposed between an end surface of the winding portion and the outer core portion. This reactor includes a resin-molded portion that integrates the outer core portion and the end surface connecting member, and a plurality of protruding portions that are provided on an outer surface of the end surface connecting member on which the outer core portion is disposed and that support the outer core portion at a distance from the outer surface, wherein the resin-molded portion enters a gap that is formed between the outer surface and the outer core portion by the protruding portions, thereby forming a resin gap between the inner core portion and the outer core portion that are separated from each other by the end surface connecting member.

In the reactor having the above-described configuration, the resin-molded portion enters the gap between the end surface of the outer core portion and the outer surface of the end surface connecting member, and the resin gap is formed between the inner core portion and the outer core portion, which are separated from each other by the end surface connecting member. In the resin gap, almost no unwanted air gap is formed. The reason that almost no air gap is formed in this gap is because, as a result of the outer core portion and the end surface connecting member being intentionally spaced apart from each other by the protruding portions formed in the end surface connecting member, during integration of the outer core portion and the end surface connecting member by the resin-molded portion, the resin flows into the gap between the outer core portion and the end surface connecting member, and this resin easily flows further between the inner core portion and the outer core portion. This reactor has less variation in the magnetic characteristics (inductance etc.) caused by an air gap described above, and therefore, a reactor that can stably exhibit desired magnetic characteristics can be obtained. The capability of obtaining a magnetically homogeneous reactor also leads to suppression of variations in magnetic characteristics among products.

Moreover, in the reactor having the above-described configuration, the outer core portion and the end surface connecting member are securely integrated by the resin-molded portion. Therefore, the reactor of the embodiment can be expected to have the effect of suppressing backlash between members included in the reactor and vibrations that are caused by the presence of an air gap.

With respect to the reactor of the embodiment, it is also possible that the end surface connecting member includes an accommodation space in the outer surface, the accommodation space accommodating a portion of an end portion of the outer core portion, the plurality of protruding portions are arranged in the accommodation space in a distributed manner, and a flow path for the resin-molded portion is formed between the protruding portions that are arranged in the distributed manner.

With the above-described configuration, the resin can be made to flow smoothly during production of the reactor. The formation state of the flow path can be changed by adjusting the number of protruding portions and the arrangement of the protruding portions, and a smoother flow of the resin can be created during the production of the reactor.

With respect to the reactor of the embodiment, it is also possible that the end surface connecting member includes a positioning portion that defines a position at which the outer core portion is attached to the end surface connecting member.

The outer core portion can be accurately disposed at a predetermined position on the end surface connecting member by forming the positioning portion in the end surface connecting member. Therefore, in producing the reactor, during integration of the end surface connecting member and the outer core portion by the resin-molded portion, it is possible to suppress displacement of the outer core portion from the predetermined position on the end surface connecting member.

<4> With respect to the reactor of the embodiment, it is also possible that the coil has a pair of said winding portions that are arranged side-by-side, the magnetic core is a ring-shaped core having a pair of said inner core portions that are disposed inside the respective winding portions and a pair of said outer core portions that are disposed at opposite end portions of the inner core portions, and a plurality of said end surface connecting members are provided, each being disposed between a respective end surface of the pair of winding portions and one of the outer core portions. In this case, a pair of core components are provided in each of which one of the end surface connecting members is integrally molded with the end portion of a corresponding one of the inner core portions by resin coating.

The productivity of the reactor can be improved by adopting the configuration in which the two core members each obtained by integrating one inner core portion and one end surface connecting member are used as a pair. The reason for this is that the end surface connecting members can be disposed at the end surfaces of the winding portions by combining the two core components with each other by inserting the inner core portion included in one of the core components into the inside of one of the winding portions and inserting the inner core portion included in the other of the core components into the inside of the other of the winding portions.

With respect to the reactor of the embodiment, it is also possible that the reactor further includes a coil cover that is fixed to the winding portion by being fitted to an outer circumferential surface of the winding portion, wherein the end surface connecting member is positioned relative to the inner core portion by being fixed to the inner core portion, and the coil cover and the end surface connecting member are engaged with each other.

The productivity of the reactor can be improved when compared with conventional reactors by forming the assembly into which the inner core portion and the coil are integrated by the coil cover. The assembly can be easily produced by simply fitting the coil cover to the winding portion and mechanically engaging the end surface connecting member, which is positioned with respect to the inner core portion, with the coil cover. In some cases, it is also possible to produce the assembly without using an adhesive. It should be noted that the above-described configuration does not deny the use of an adhesive, and an adhesive may also be used in a supplementary manner in producing the assembly.

Moreover, with the above-described configuration, the inner core portion can be accurately positioned in the inside of the winding portion of the coil. The reason for this is that as a result of fitting the coil cover to the winding portion, the position of the coil cover relative to the winding portion is fixed, and then, as a result of mechanically engaging the coil cover and the end surface connecting member with each other, the position of the end surface connecting member relative to the coil cover is fixed. Since the end surface connecting member is fixed in a state in which it is positioned at an end portion of the inner core portion, the position of the inner core portion relative to the winding portion is fixed via the end surface connecting member and the coil cover.

With respect to the reactor of the embodiment, it is also possible that one of the coil cover and the end surface connecting member includes an engagement protrusion, and the other of the coil cover and the end surface connecting member includes an engagement hole that corresponds to the engagement protrusion, and the coil cover and the end surface connecting member are engaged with each other by the engagement protrusion being fitted into the engagement hole.

The mechanical engagement mechanism using the engagement protrusion and the engagement hole can be easily formed and furthermore has excellent engagement strength. Although either the engagement protrusion or the engagement hole may be provided in the coil cover, it is preferable to provide the engagement protrusion in the coil cover and provide the engagement hole in the end surface connecting member.

Hereinafter, embodiments of a reactor of the present invention will be described based on the drawings. In the drawings, like reference numerals denote objects having like names.

Embodiment 1

Overall Configuration

Figure 1:
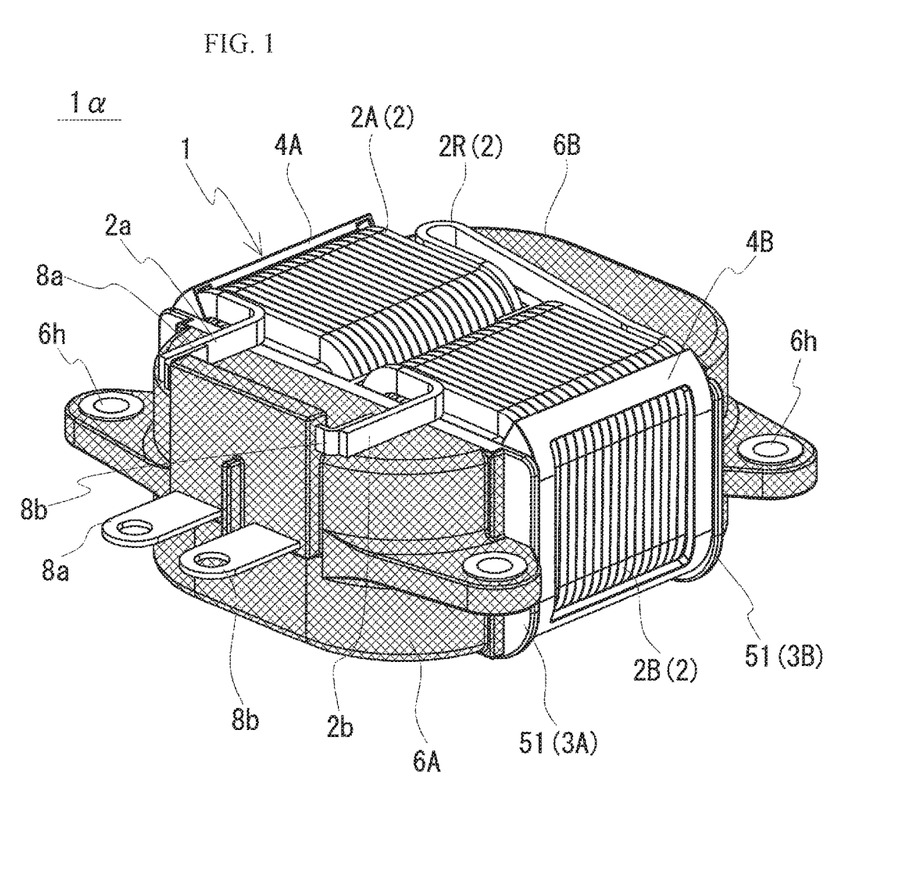
FIG. 1 is a schematic perspective view of a reactor of Embodiment 1.
Figure 2:
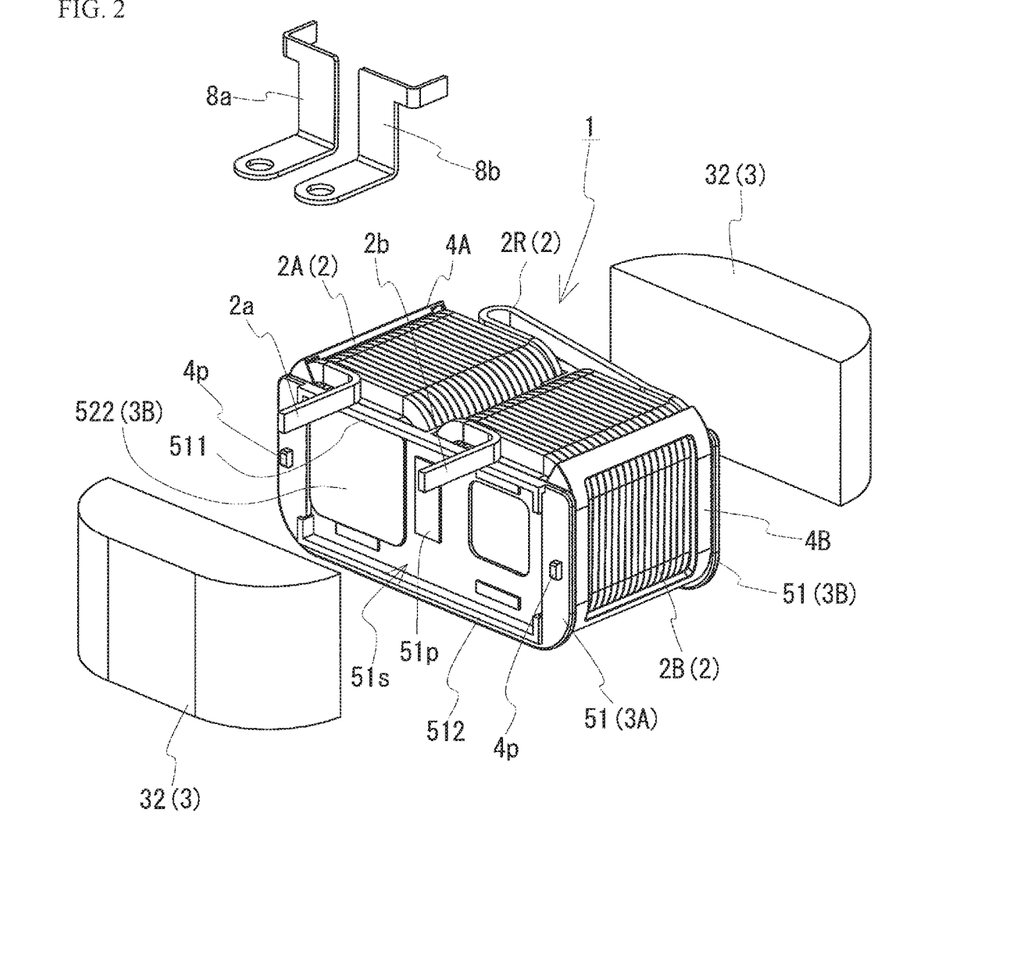
FIG. 2 is a schematic perspective view of an assembly and outer core portions included in the reactor of Embodiment 1.
Figure 3:
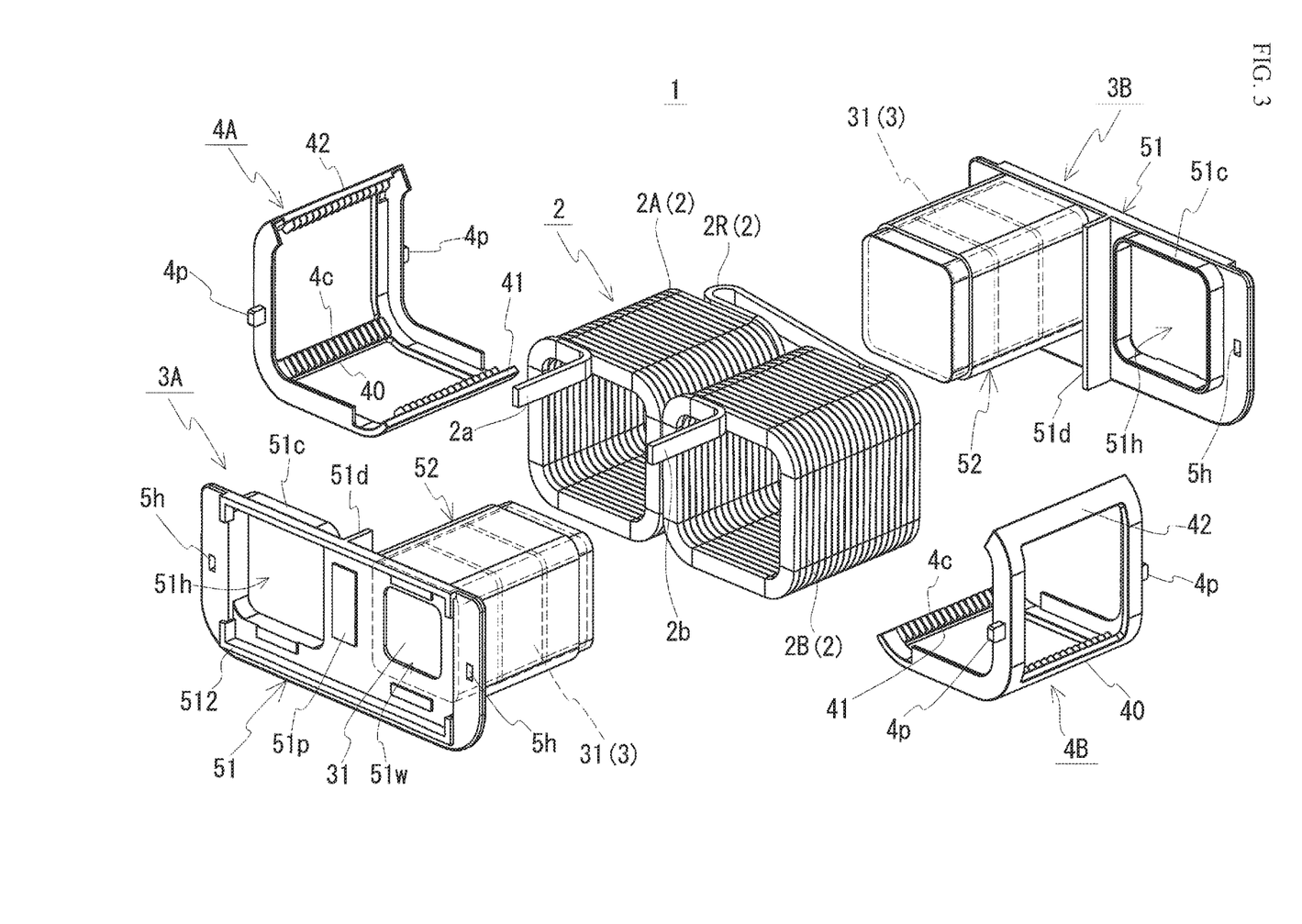
FIG. 3 is a schematic exploded perspective view of the assembly included in the reactor of Embodiment 1.
Figure 4:
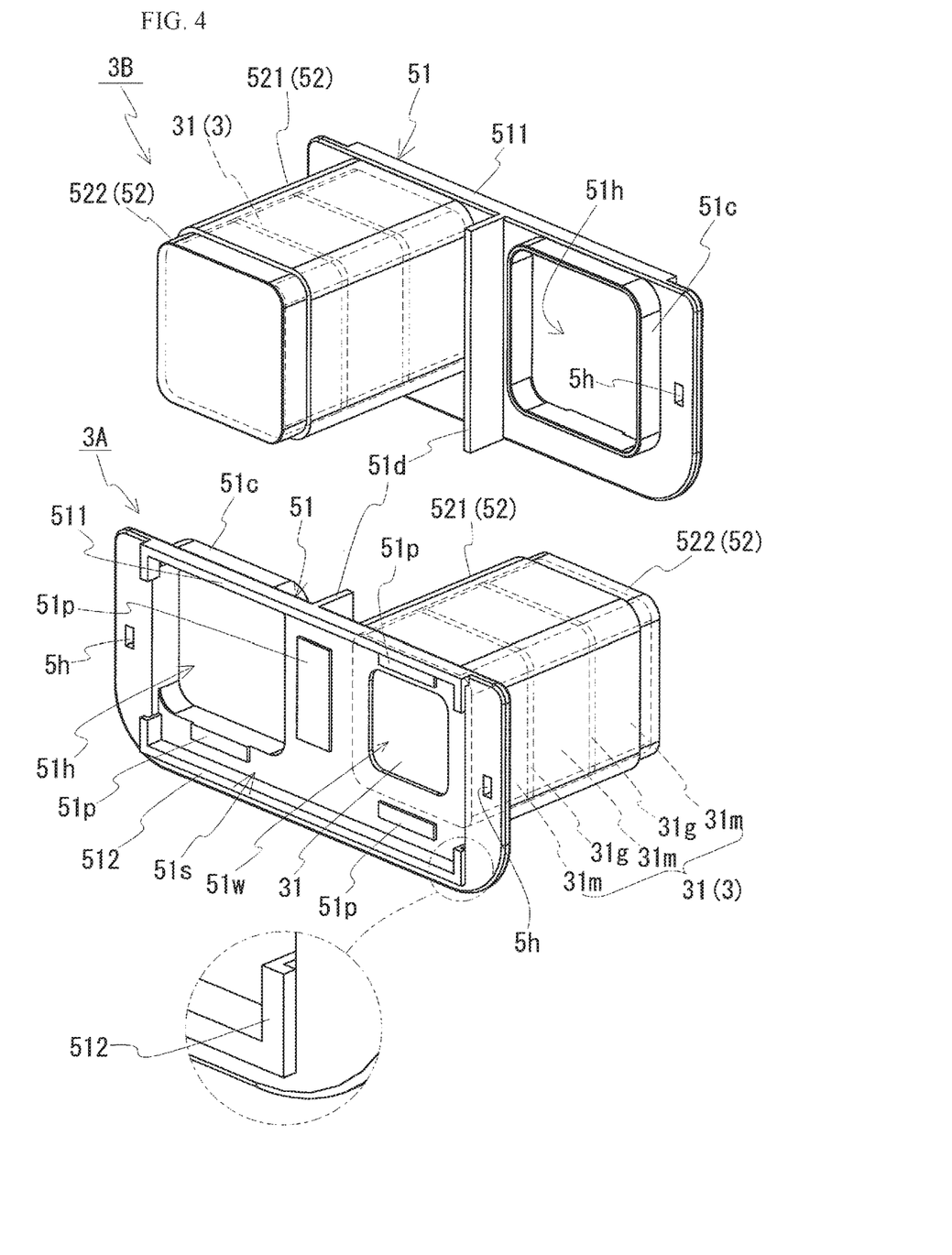
FIG. 4 is a schematic perspective view of core components, which are constituent members of the assembly included in the reactor of Embodiment 1.
Figure 5:
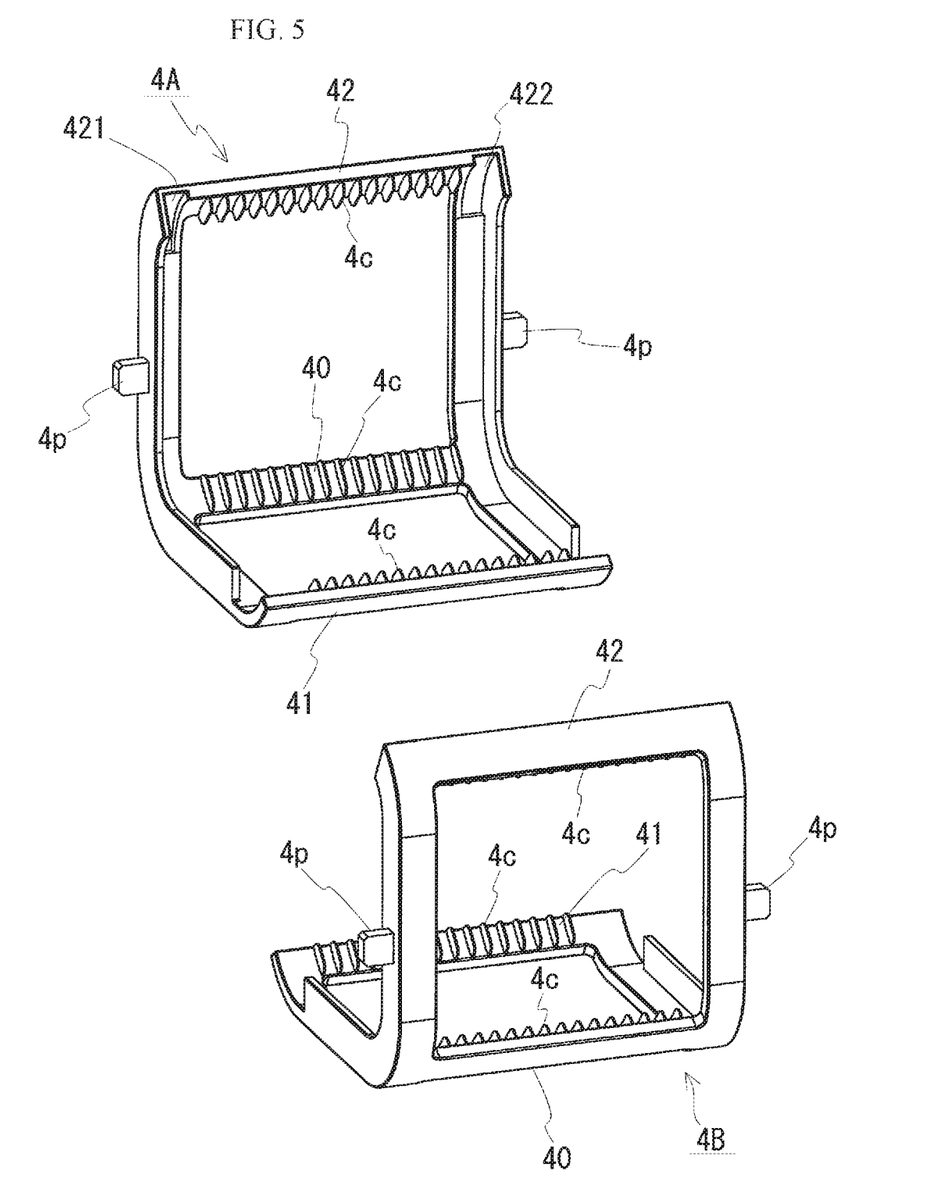
FIG. 5 is a schematic perspective view of coil covers, which are constituent members of the assembly included in the reactor of Embodiment 1.

A reactor 1a of Embodiment 1 will be described with reference to FIGS. 1 to 5. FIG. 1 is a schematic perspective view of the reactor 1a, FIG. 2 is a schematic perspective view of an assembly 1 and outer core portions 32 included in the reactor 1a, and FIG. 3 is a schematic exploded perspective view of the assembly 1. Also, FIG. 4 is a schematic perspective view of core components 3A and 3B, which are constituent members of the assembly 1, and FIG. 5 is a schematic perspective view of coil covers 4A and 4B, which are also constituent members of the assembly 1. It should be noted that in FIG. 1, resin-molded portions 6A and 6B, which are constituent members of the reactor 1a, are indicated by cross-hatching.

The reactor 1a of the present embodiment shown in the schematic perspective view of FIG. 1 includes, like conventional reactors, a coil 2 and a magnetic core (located in a position not visible in FIG. 1) that forms a ring-shaped closed magnetic circuit. The reactor 1a is used in a state in which its surface on a lower side of the paper plane is in contact with an installation target such as a cooling base. The coil 2 is a member having a pair of winding portions 2A and 2B that are each formed by winding a wire. The magnetic core 3 includes inner core portions 31 (described later with reference to FIG. 3) that are disposed inside the respective winding portions 2A and 2B and the outer core portions 32 (described later with reference to FIG. 2) that protrude from the winding portions 2A and 2B without being covered by the winding portions 2A and 2B, and forms a ring-shaped closed magnetic circuit. End surface connecting members 51 that ensure insulation of the coil 2 from the outer core portions 32 are each interposed between a corresponding one end surface of the winding portions 2A and 2B and a corresponding one of the outer core portions 32.

In the reactor 1a of the present embodiment including the above-described coil 2, magnetic core 3, and end surface connecting members 51, a fixing structure in which the outer core portions 32 (see FIG. 2) are fixed to the end surface connecting members 51 by the resin-molded portions 6A and 6B is one of the differences from conventional reactors. Moreover, the reactor 1a of the present invention is also different from conventional reactors in that it includes the assembly 1, in which the coil 2, the inner core portions 31, and the coil covers 4A and 4B are mechanically engaged with each other (see especially FIG. 3). Hereinafter, various constituents included in the reactor 1a will be described in detail. In the description of those various constituents, the configuration of the assembly 1 will be first described. The reason for this is that, as will be described later, the end surface connecting members 51 constitute a portion of the assembly 1, and the end surface connecting members 51 are related to the fixing structure in which the outer core portions 32 are fixed by the resin-molded portions 6A and 6B.

Assembly

The assembly 1 will be described with reference mainly to FIGS. 2 and 3, and to FIGS. 4 and 5 as necessary. The assembly 1 is configured by mechanically combining the coil 2, the coil covers 4A and 4B that are fitted to outer circumferential surfaces of the respective winding portions 2A and 2B included in the coil 2, and the pair of inner core portions 31 (see FIG. 3) that are inserted into the inside of the respective winding portions 2A and 2B. The end surface connecting members 51 that are mechanically engaged with the coil covers 4A and 4B are provided at axial end portions of the inner core portions 31, and a configuration is adopted in which when the coil 2, the coil covers 4A and 4B, and the inner core portions 31 are combined together, relative positions of the various members are fixed. Hereinafter, various constituents of the assembly 1 will be described in detail.

Coil

As shown in FIG. 3, the coil 2 of the present embodiment includes the pair of winding portions 2A and 2B and a connecting portion 2R that connects the two winding portions 2A and 2B to each other. The winding portions 2A and 2B are formed into hollow tube shapes by winding a wire with the same number of turns in the same winding direction and are arranged side-by-side such that their axial directions are parallel to each other. Moreover, the connecting portion 2R is a portion that connects the two winding portions 2A and 2B to each other and that is bent into a U-shape. The coil 2 may be formed by helically winding a single wire having no joint portion, or may be formed by manufacturing the winding portions 2A and 2B using separate wires and joining wire end portions of the respective winding portions 2A and 2B to each other through welding, crimping, or the like.

The winding portions 2A and 2B of the present invention are formed into angular tube shapes. The angular tube-shaped winding portions 2A and 2B refer to winding portions whose end surfaces have a quadrangular shape (including a square shape) with rounded corners. It goes without saying that the winding portions 2A and 2B may also be formed into cylindrical tube shapes. A cylindrical tube-shaped winding portion refers to a winding portion whose end surfaces have a closed surface shape (elliptical shape, perfect circle shape, racetrack shape, or the like).

The coil 2 including the winding portions 2A and 2B can be composed of a coated wire including a conductor, such as a rectangular wire, a round wire, or the like, made of a conductive material, such as copper, aluminum, magnesium, or an alloy thereof, and an insulating coating made of an insulating material and provided on an outer circumference of the conductor. In the present embodiment, each winding portion 2A, 2B is formed by winding a coated rectangular wire edgewise, the coated rectangular wire being constituted by a rectangular wire made of copper, which serves as the conductor, and an insulating coating made of enamel (typically, polyamideimide).

Both end portions 2a and 2b of the coil 2 are drawn out from the winding portions 2A and 2B, and are respectively connected to terminal members 8a and 8b (see FIG. 2). An external device (not shown) such as a power supply that supplies power to the coil 2 is connected via the terminal members 8a and 8b. The direction in which the end portions 2a and 2b are drawn out is not limited, but in the present embodiment, the end portions 2a and 2b are drawn out in the axial direction of the winding portions 2A and 2B.

Coil Covers

The coil covers 4A and 4B are members that are fixed to the respective winding portions 2A and 2B by being fitted to the outer circumferential surfaces of the respective winding portions 2A and 2B. The main role of the coil covers 4A and 4B is to position the inner core portions 31 inside the winding portions 2A and 2B by mechanically engaging with the end surface connecting members 51.

As shown in FIG. 5, each of the coil covers 4A and 4B is a member having a shape that is obtained by bending a plate material having two through-holes into an L-shape at a position between the two through-holes, or in other words, a shape that is obtained by connecting two frame-shaped members to each other into an L-shape. An open portion of the L-shape functions as a fitting slit that is used during fitting of the coil covers 4A and 4B to the respective winding portions 2A and 2B (see FIGS. 2 and 3). Since the fitting slit is provided in each of the coil covers 4A and 4B, the coil covers 4A and 4B can be fitted from the outer circumferential side of the respective winding portions 2A and 2B. Thus, it is easy to attach the coil covers 4A and 4B to the winding portions 2A and 2B.

An inner circumferential surface of a bent portion (see reference numeral 40) of the L-shape of each of the coil covers 4A and 4B has a shape corresponding to a corner portion of each of the quadrangular tube-shaped winding portions 2A and 2B (see FIG. 3). Moreover, those portions (see reference numerals 41 and 42) of each of the substantially L-shaped coil covers 4A and 4B that correspond to end portions of the L-shape are curved into shapes corresponding to respective corner portions of each of the angular tube-shaped winding portions 2A and 2B. The bent portion (retaining portion) 40 that is located at the bent position of the L-shape and the curved portions (retaining portions) 41 and 42 that are located at the end portions of the L-shape retain, respectively, the corner portion connecting a lower surface and an outer surface of the winding portion 2A or 2B, the corner portion connecting the lower surface and an inner surface of that winding portion, and the corner portion connecting the outer surface and an upper surface of that winding portion among the four corner portions of the winding portion 2A or 2B that are lined up in the circumferential direction (see also FIG. 3). These retaining portions 40, 41, and 42 stabilize the state in which the coil covers 4A and 4B are fixed to the winding portions 2A and 2B and make the coil covers 4A and 4B hard to detach from the winding portions 2A and 2B. It should be noted that in the case where the winding portions 2A and 2B are cylindrical tube-shaped, if the end surface shape of the coil covers 4A and 4B is set to be a circular arc shape having a length that is longer than a half but not longer than three fourths of the circumferential length of the winding portions 2A and 2B, coil covers 4A and 4B that can be fitted to the winding portions 2A and 2B from the outer circumferential side thereof and that can be firmly fixed to the winding portions 2A and 2B can be obtained.

A plurality of comb teeth 4c are formed on the inner circumferential surface of each of the curved portions 40, 41, and 42. The distance between adjacent comb teeth 4c is substantially equal to the thickness of each turn of the winding portions 2A and 2B. Thus, when the coil covers 4A and 4B are fitted to the outer circumference of the winding portions 2A and 2B, and the comb teeth 4c are inserted between the turns of the winding portions 2A and 2B, the individual turns are fitted between adjacent comb teeth 4c. The comb teeth 4c can ensure insulation between the turns by separating the turns from each other and suppress rubbing of the turns against each other and resulting damage to the enamel insulation coating on the conductor wire surface. Moreover, since the comb teeth 4c of the coil covers 4A and 4B are fitted between the turns of the winding portions 2A and 2B, the coil covers 4A and 4B are securely fixed to the winding portions 2A and 2B, and thus, detachment of the coil covers 4A and 4B due to vibrations transmitted from the vehicle can also be suppressed.

Turn accommodating portions 421 and 422 into which the first turn and the last turn of each of the winding portions 2A and 2B are fitted are respectively formed on one end side and the other end side of the retaining portion 42 of each of the coil covers 4A and 4B with respect to the axial direction of the coil covers 4A and 4B. A length $L_1$ between the turn accommodating portions 421 and 422 is approximately equal to a length $L_2$ obtained by adding the total thickness of the turns that are disposed between the two accommodating portions 421 and 422 and the total thickness of the plurality of comb teeth 4c of the coil cover 4A or 4B ($L_1 \neq L_2 \pm 1$ mm or shorter). Forming the coil covers 4A and 4B having such a size can make the coil covers 4A and 4B hard to detach from the winding portions 2A and 2B.

The coil covers 4A and 4B having the above-described configuration each further include engagement protrusions 4p for mechanically engaging the coil covers 4A and 4B themselves with the end surface connecting members 51 (see FIG. 3), which will be described later. The engagement protrusions 4p of the present embodiment are the protrusions protruding in the axial direction (same as the axial direction of the winding portions 2A and 2B) of the coil covers 4A and 4B, and are provided such that one each is disposed on one and the other end sides of each of the coil covers 4A and 4B with respect to the axial direction. Each engagement protrusion 4p is a substantially quadrangular prism-shaped protrusion and has a tapered shape with its leading end portion being diagonally cut. Since the engagement protrusions 4p have the tapered shape, the engagement protrusions 4p can be easily fitted into corresponding engagement holes 5h, which will be described later.

Preferably, the coil covers 4A and 4B are composed of a non-conductive material. This makes it easy to ensure insulation between the installation target and the coil 2 when the reactor 1a is in contact with the installation target. For example, thermoplastic resins such as polyphenylene sulfide (PPS) resins, polytetrafluoroethylene (PTFE) resins, liquid crystal polymers (LCPs), polyamide (PA) resins such as nylon 6 and nylon 66, polybutylene terephthalate (PBT) resins, and acrylonitrile butadiene styrene (ABS) resins can be used as the non-conductive material. In addition, thermosetting resins such as unsaturated polyester resins, epoxy resins, urethane resins, and silicone resins can also be used. Since resins have excellent flexibility, they enable the coil covers 4A and 4B to be easily fitted into the winding portions 2A and 2B, and are thus preferable. It is also possible to improve heat dissipation properties of the coil covers 4A and 4B by mixing a ceramics filler into the above-described resins. For example, non-magnetic powder such as alumina or silica can be used as the ceramics filler.

Inner Core Portions and End Surface Connecting Members

In the present embodiment, the inner core portions 31 and the end surface connecting members 51 are used in the form of the substantially L-shaped core components 3A and 3B into which the inner core portions 31 and the corresponding end surface connecting members 51 are integrated. More specifically, the outer circumference of each inner core portion 31 is molded with a resin coating, and a corresponding one of the end surface connecting members 51 is formed of a portion of that resin coating. The two core components 3A and 3B are members having the same shape as shown in FIG. 4, and the core component 3A coincides with the core component 3B when rotated 180° in a horizontal direction. Accordingly, various portions of the core component 3B are denoted by the same reference numerals as those of the core component 3A. It should be noted that the two core components 3A and 3B are not necessarily required to have the same shape.

The inner core portions 31 included in the respective core components 3A and 3B are each a stacked column-shaped body in which core pieces 31m containing a magnetic material and having a substantially rectangular parallelepiped shape and gap materials 31g having a lower magnetic permeability than the core pieces 31m are alternately connected to each other. Alternatively, each inner core portion 31 may be composed of a single core piece having a column shape. Each inner core portion 31 may be entirely accommodated in the corresponding winding portion 2A, 2B, or at least a portion thereof on one end side or on the other end side with respect to the axial direction may protrude from the corresponding winding portion 2A, 2B. A powder compact using a soft magnetic powder typically composed of an iron-group metal, such as iron, or an alloy thereof, a composite material made of a resin containing a soft magnetic powder, a stacked body obtained by stacking a plurality of magnetic thin plates (e.g., electromagnetic steel sheets) having an insulating film, and the like can be used for the core pieces 31m constituting the above-described inner core portions 31. Moreover, a non-magnetic material such as alumina can be used for the gap materials 31g. Alternatively, the gap materials 31g can also be formed by a resin that forms core coating portions 52, which will be described later.

The end surface connecting members 51, which are fixed to the end surfaces of the inner core portions 31, and the core coating portions 52 that cover the outer circumferential surfaces of the respective inner core portions 31 are formed by the coating resin molded on the inner core portions 31 described above. It goes without saying that each of the core components 3A and 3B can also be formed by separately preparing and connecting the end surface connecting member 51 and the inner core portion 31 covered by the core coating portion 52.

As shown in FIG. 2, the end surface connecting members 51 are members that are each disposed between an end surface of the winding portions 2A and 2B and a corresponding one of the outer core portions 32 to position the inner core portions 31 and the outer core portions 32 and ensure the insulation between the coil 2 and the outer core portions 32. Moreover, in the present embodiment, the end surface connecting members 51 are also members that are mechanically engaged with the above-described coil covers 4A and 4B to fix the positions of the inner core portions 31 in the inside of the respective winding portions 2A and 2B together with the coil covers 4A and 4B. For this purpose, the engagement holes 5h into which the engagement protrusions 4p of the coil covers 4A and 4B are fitted are formed in the end surface connecting members 51 (see FIGS. 3 and 4).

The engagement holes 5h of the present embodiment have an internal shape and internal dimensions that allow the engagement protrusions 4p of the coil covers 4A and 4B to be individually press-fitted into the engagement holes 5h. Specifically, the engagement holes 5h have an internal shape and internal dimensions that are similar to and slightly smaller than the external shape of a base portion of the individual engagement protrusions 4p.

On the outer surface of each of the end surface connecting members 51 that constitutes the surface on which a corresponding one of the outer core portions 32 is disposed (see core component 3A), positioning portions 511 and 512 that define the position at which the outer core portion 32 is attached to the end surface connecting member 51 are formed (see also FIG. 2). The positioning portions 511 and 512, which are protrusions protruding from the outer surface of the end surface connecting member 51, are formed in overall square bracket-shaped shapes. A portion enclosed by these square bracket-shaped positioning portions 511 and 512 is slightly recessed from other portions, and the outer core portion 32 is positioned relative to the end surface connecting member 51 by a portion of the end portion of the outer core portion 32 being accommodated in that recessed portion (accommodation space 51s).

Of the positioning portions 511 and 512, the positioning portion 512, which is located on the lower side of the reactor 1a, also has the function of a detachment suppressing portion that suppresses detachment of the resin-molded portion 6A or 6B (see FIG. 1), which will be described later. Specifically, as shown in the inset circled by a dotted line in FIG. 4, the positioning portion 512 is formed to have a substantially L-shaped cross section. That is to say, an end portion of the positioning portion 512 with respect to a protruding direction is bent to an outer side (opposite side to the accommodation space 51s).

On a bottom surface of the accommodation space 5 is, a plurality of protruding portions 51p protruding from that bottom surface are formed. These protruding portions 51p support the outer core portion 32 that is fitted in the accommodation space 51s at a distance from the bottom surface of the accommodation space 51s (see also FIG. 2). With the outer core portion 32 being supported at a distance from the bottom surface of the accommodation space 51s, the resin can spread all through a gap that is formed between the end surface of the outer core portion 32 and the bottom surface of the accommodation space 51s when the outer core portion 32 and the end surface connecting member 51 are integrated by the outer resin-molded portion 6A or 6B, which will be described later. Therefore, a gap that is formed between the outer core portion 32 and the corresponding inner core portion 31 can be filled with the resin. In this manner, the resin enters the gap between the inner core portion 31 and the outer core portion 32, allowing almost no air gap to be formed, so that variations in the magnetic characteristics (inductance etc.) caused by an air gap can be reduced, and stable magnetic characteristics can be obtained. Moreover, since the gap that is formed between the end surface connecting member 51 and the outer core portion 32 is filled with the resin, and thus almost no air gap is formed therebetween, the joining strength between the end surface connecting member 51 and the outer core portion 32 can be improved. The outer core portion 32 and the end surface connecting member 51 are securely integrated with each other by the resin-molded portion 6A or 6B, which will be described later, and therefore the effect of suppressing backlash between the outer core portion 32 and the end surface connecting member 51 that is caused by vibrations transmitted from the vehicle, as well as vibrations that are caused by an air gap can be expected.

Moreover, in the present embodiment, the protruding portions 51p are arranged at a plurality of locations in a distributed manner, and thus a flow path for the resin is formed between the protruding portions 51p, and it is easy for the resin to spread all through the gap that is formed between the end surface of the outer core portion 32 and the bottom surface of the accommodation space 51s. The arrangement of the protruding portions 51p enables adjustment of the flow of the resin, and thus the resin can be filled uniformly. The protruding height of these protruding portions 51p from the bottom surface can be selected as appropriate so that a gap of a predetermined length is formed between the inner core portion 31 and the outer core portion 32. Moreover, the locations at which the protruding portions 51p are arranged can be selected as appropriate in accordance with the viscosity and the like of the resin so that the resin can smoothly flow into the gap between the inner core portion 31 (end surface connecting member 51) and the outer core portion 32. As in this example, a smooth flow of the resin can be created by forming a flow path for the resin by arranging the protruding portions 51p in the accommodation space 51s in a distributed manner, and changing the formation state of the flow path by adjusting the number of protruding portions 51p and the arrangement of the protruding portions 51p.

A window 51w is formed in a portion of the bottom surface of the accommodation space 51s that corresponds to the end surface of the inner core portion 31, and the end surface of the inner core portion 31 is exposed from this window 51w. Thus, when the outer core portion 32 and the end surface connecting member 51 are integrated by the resin-molded portion 6A or 6B, the resin flows into the window 51w, so that a resin gap is formed between the inner core portion 31 and the outer core portion 32.

Moreover, an insertion hole 51h is formed in a portion of the bottom surface of the accommodation space 51s of one core component 3A (3B), the portion corresponding to the end surface of the inner core portion 31 of the other core component 3B (3A). The insertion hole 51h of the core component 3A (3B) is a hole into which a small diameter portion 522 of the core component 3B (3A) is inserted.

A tubular portion 51c and a partition portion 51d are formed on an inner surface (surface that is located on the side to which the inner core portion 31 is fixed) of each end surface connecting member 51, the inner surface being located on the opposite side to the accommodation space 51s. The tubular portion 51c protrudes from the inner surface and forms the above-described insertion hole 51h.

The partition portion 51d is provided at a position between the above-described tubular portion 51c and the inner core portion 31 covered by the core coating portion 52 so as to protrude from the inner surface of the end surface connecting member 51. When each of the core components 3A and 3B is assembled to the coil 2, this partition portion 51d is disposed between the winding portions 2A and 2B and keeps the two winding portions 2A and 2B in a separated state (see also FIG. 3). This separation makes it possible to reliably ensure insulation between the winding portions 2A and 2B.

On the other hand, the core coating portion 52, which is formed of the coating resin as in the case of the end surface connecting member 51, covers the circumferential surface of the inner core portion 31 over the entire length of the inner core portion 31 in a longitudinal direction. That is to say, the core coating portion 52 plays a role corresponding to a tubular bobbin (inner connecting member) of a conventional configuration. This core coating portion 52 is constituted by a large diameter portion 521 extending a predetermined length from the end surface connecting member 51 and the small diameter portion 522 that is continuous with the large diameter portion 521. The outer diameter of the small diameter portion 522 is smaller than the outer diameter of the large diameter portion 521, and the inner diameter of the small diameter portion 522 is equal to the inner diameter of the large diameter portion 521. That is to say, the small diameter portion 522 is formed to have a smaller wall thickness than the large diameter portion 521. The external shape of the small diameter portion 522 is substantially the same as the internal shape of the above-described tubular portion 51c, so that the small diameter portion 522 can be inserted into the tubular portion 51c of the other core component. Therefore, when the core component 3A and the core component 3B are brought close to each other, the small diameter portion 522 of the core component 3A is fitted into the tubular portion 51c of the core component 3B and vice versa, and thus the two core components 3A and 3B are connected to each other, forming a ring shape. At this time, a step that is formed between the large diameter portion 521 and the small diameter portion 522 abuts against an end portion of the mating tubular portion 51c, and thus the two core components 3A and 3B are positioned at predetermined relative positions.

With regard to the material composing the above-described end surface connecting members 51 and core coating portions 52, thermoplastic resins such as PPS resins, PTFE resins, LCPs, PA resins, PBT resins, and ABS resins can be used. In addition, thermosetting resins such as unsaturated polyester resins, epoxy resins, urethane resins, and silicone resins can also be used. Moreover, it is also possible to improve heat dissipation properties of the members 51 and 52 by mixing a ceramics filler into these resins. For example, non-magnetic powder such as alumina or silica can be used as the ceramics filler.

In this example, using resin molding, the core coating portion 52 is formed on the inner core portion 31, and also the end surface connecting member 51 is integrally molded therewith. In this manner, the end surface connecting member 51 is fixed to the end portion of the inner core portion 31. It goes without saying that each of the core components 3A and 3B can also be formed by separately preparing the inner core portion 31 having the core coating portion 52 and the end surface connecting member 51 and fixing the end surface connecting member 51 to the end portion of the inner core portion 31 through bonding, fitting, or the like.

Furthermore, in this example, during formation of the core coating portion 52 by resin molding, the core pieces 31m are arranged at intervals in a mold, and the gap materials 31g are formed by filling the resin into air gaps between the core pieces 31m. Thus, an inner core portion 31 is obtained in which the plurality of core pieces 31m are integrated together, and also the gap materials 31g formed of the resin that forms the core coating portion 52 are formed between the core pieces 31m.

Outer Core Portions

As shown in FIG. 2, the pair of outer core portions 32 are attached to the above-described assembly 1. The outer core portions 32 are members that form the ring-shaped magnetic core 3 together with the inner core portions 31 included in the above-described core components 3A and 3B. The shape of the outer core portions 32 is not limited, and the outer core portions 32 can have any shape that makes the outer core portions 32 to be connectable to the end surfaces of the pair of inner core portions 31 disposed inside the respective winding portions 2A and 2B. For example, as shown in FIG. 2, outer core portions 32 that each have a column shape whose upper and lower surfaces are substantially dome-shaped can be used. In addition, outer core portions that each have a substantially rectangular parallelepiped shape can also be used.

As in the case of the core pieces 31m of the inner core portions 31 shown in FIG. 4, the outer core portions 32 may be composed of a stacked body obtained by stacking electromagnetic steel sheets, may be composed of a powder compact obtained by pressure molding a soft magnetic powder, or may be composed of a composite material obtained by dispersing a soft magnetic powder in a resin. The outer core portions 32 may have the same configuration as the core pieces 31m of the inner core portions 31, or may have a different configuration. In the latter case, for example, a configuration is conceivable in which the inner core portions 31 are composed of a powder compact, and the outer core portions 32 are composed of a composite material.

Resin-Molded Portions

The assembly 1 and the outer core portions 32 shown in FIG. 2 are integrated together by the resin-molded portions 6A and 6B as shown in FIG. 1. More specifically, the resin-molded portions 6A and 6B each cover the entire outer circumferential surface of the corresponding outer core portion 32 and a major portion of the outer surface (surface on which the outer core portion 32 is disposed) of the corresponding end surface connecting member 51, and as a result, the outer core portion 32 is fixed to the end surface connecting member 51. Moreover, each of the resin-molded portions 6A and 6B enters into the gap that is formed between the end surface of the corresponding outer core portion 32 and the outer surface (in the present example, bottom surface of the accommodation space 51s) of the corresponding end surface connecting member 51, and securely connects the outer core portion 32 to the end surface connecting member 51 of the assembly 1 to each other.

It should be noted that the resin-molded portions 6A and 6B are not necessarily required to cover the entire outer circumferential surface of the respective outer core portions 32, and may also cover only a portion of the respective resin-molded portions 6A and 6B. Even in that case, it goes without saying that the resin-molded portions 6A and 6B need be configured so as to prevent detachment of the outer core portions 32 from the end surface connecting members 51.

In the present embodiment, the terminal members 8a and 8b as well as metal collars 6h are further integrated with the assembly 1 and the outer core portions 32 by the resin-molded portions 6A and 6B. The terminal members 8a and 8b constitute a power supply path connected to the end portions 2a and 2b of the coil 2. The collars 6h constitute attachment holes for fixing the reactor 1a to the installation target.

The resin-molded portions 6A and 6B having the above-described configuration can be formed by insert molding. For example, the assembly 1 and the outer core portions 32 are arranged in a mold, and in this state, the inside of the mold is filled with the resin constituting the material for the resin-molded portions 6A and 6B. In this manner, the resin-molded portions 6A and 6B that integrate the end surface connecting members 51 of the assembly 1 and the outer core portions 32 can be formed.

With regard to the resin composing the resin-molded portions 6A and 6B, for example, thermoplastic resins such as PPS resins, PTFE resins, LCPs, PA resins (nylon 6, nylon 66, etc.), PBT resins, and ABS resins can be used. In addition, thermosetting resins such as unsaturated polyester resins, epoxy resins, urethane resins, and silicone resins can also be used. Unsaturated polyesters have the advantages of being unbreakable, inexpensive, and so on. Moreover, it is also possible to improve heat dissipation properties of the resin-molded portions 6A and 6B by mixing a ceramics filler such as alumina or silica into these resins.

Other Configurations

It is preferable that a sensor unit is disposed in a gap that is formed between the winding portions 2A and 2B shown in FIG. 1. The sensor unit is a member that includes a sensor, a holder for holding the sensor, and a cable portion for transmitting detection results of the sensor, and that measures a physical quantity of the reactor 1a during operation. The sensor may be, for example, a thermal element such as a thermistor, an acceleration sensor, or the like. Moreover, the holder may be a member for not only holding the sensor but also fixing the sensor at a position between the winding portions 2A and 2B. If the holder is provided with comb teeth that are disposed between the turns of the winding portions 2A and 2B, a fixation state in which the holder is securely fixed to the coil 2 can be achieved.

Procedures for Producing Reactor

Procedures for producing the reactor 1a having the above-described configuration will be described based on FIGS. 1 to 3. Moreover, in the description, reference is made to FIG. 6 as appropriate, which is an explanatory diagram illustrating flow of the resin during molding of the outer core portions 32 to the assembly 1 with the resin.

Production of Assembly

First, the assembly 1 shown in FIG. 2 is produced. For this purpose, as shown in FIG. 3, the coil 2, the coil covers 4A and 4B, and the core components 3A and 3B are prepared. Then, the coil covers 4A and 4B are fitted to the outer circumferential surfaces of the respective winding portions 2A and 2B of the coil 2. In this operation, the comb teeth 4c of the coil covers 4A and 4B are disposed between the turns of the winding portions 2A and 2B. At this time, the first turn and the last turn of each of the winding portions 2A and 2B are fitted into the turn accommodating portions 421 and 422 (see FIG. 5), respectively, of the corresponding coil cover 4A or 4B, and the coil covers 4A and 4B are firmly fixed to the outer circumferential surfaces of the respective winding portions 2A and 2B.

Next, the inner core portions 31 of the core components 3A and 3B are inserted into the inside of the respective winding portions 2A and 2B. Then, the engagement protrusions 4p of the coil covers 4A and 4B are fitted into the corresponding engagement holes 5h provided in the end surface connecting members 51 of the core components 3A and 3B to bring the coil covers 4A and 4B into mechanical engagement with the end surface connecting members 51. At this time, the small diameter portion 522 of the core component 3A is inserted into the insertion hole 51h of the core component 3B, and the small diameter portion 522 of the core component 5B is inserted into the insertion hole 51h of the core component 3A. Thus, as shown in FIG. 2, the two core components 3A and 3B are connected to each other, forming a ring shape. The small diameter portions 522 inserted into the insertion holes 51h protrude from the bottom surfaces of the respective accommodation spaces 51s (see FIG. 2). The protruding length of the small diameter portions 522 is not longer than the protruding length of the protruding portions 51p.

In the above-described assembly 1, the positions of the coil covers 4A and 4B relative to the winding portions 2A and 2B are fixed, and the positions of the end surface connecting members 51 relative to the coil covers 4A and 4B are fixed. Since the end surface connecting members 51 are integrated with the respective inner core portions 31, the inner core portions 31 are accurately positioned relative to the winding portions 2A and 2B via the end surface connecting members 51 and the coil covers 4A and 4B.

Integration of Outer Core Portions with Assembly

Next, as shown in FIG. 2, the outer core portions 32 are fitted into the accommodation spaces 51s of the respective end surface connecting members 51 of the assembly 1, and furthermore, the terminal members 8a and 8b are connected to the respective end portions 2a and 2b of the coil 2 through soldering or the like. During fitting of the outer core portions 32, an adhesive may be applied to an end surface of each outer core portion 32 on a fitted side in advance.

An integrated component into which the assembly 1, the outer core portions 32, and the terminal members 8a and 8b are integrated is placed in a mold, the metal collars 6h (see FIG. 1) constituting the attachment holes are also placed in the mold, and the resin is filled into the mold. The resin filled in the mold spreads all through the gaps that are formed by the end surfaces of the outer core portions 32 with the bottom surfaces of the accommodation spaces 51s of the respective end surface connecting members 51. The flow of the resin in the gaps will be described using the explanatory diagram in FIG. 6 as an example.

Figure 6:
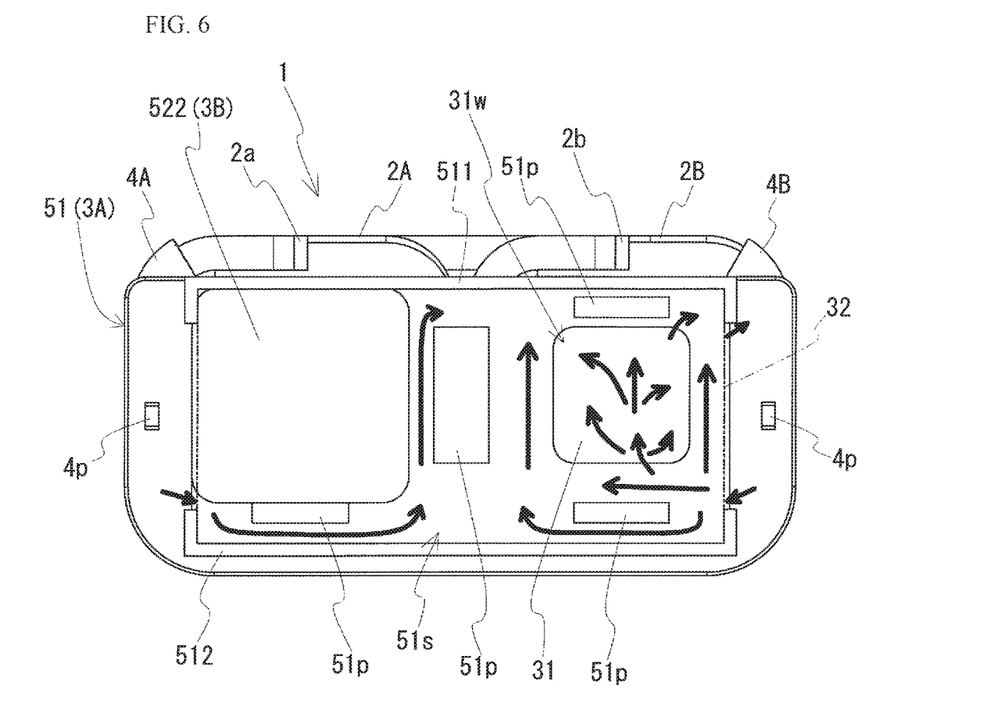
FIG. 6 is an explanatory diagram illustrating flow of a resin when the outer core portions are molded to the assembly with the resin.

FIG. 6 is the explanatory diagram in which the flow of the resin when the resin is filled therein from positions close to the lower side of the paper plane in side portions of the outer core portion 32 is indicated by the thick arrows, the side portions being indicated by dashed and double dotted lines. The resin filled into the mold first enters the inside of the accommodation space 51s from gaps that are formed between the accommodation space 51s and side surfaces of the outer core portion 32 at left and right edges of the accommodation space 51s. At this time, since the outer core portion 32 is separated from the bottom surface of the accommodation space 51s of the end surface connecting member 51 by the protruding portions 51p, which are formed on that bottom surface, the resin spreads out in the gap between the end surface of the outer core portion 32 and the bottom surface of the accommodation space 51s as indicated by the thick arrows. The resin that has spread out in the gap flows into the portion of the window 51w, spreads out over the end surface of the inner core portion 31 that is exposed in the window 51w, and forms a resin gap between the end surface of the inner core portion 31 and the end surface of the outer core portion 32. Since the flow path for the resin is formed between the protruding portions 51p, which are arranged in the accommodation space 51s in a distributed manner, the resin flows smoothly and does not stagnate. The formation state of the flow path can be changed by adjusting the number of protruding portions 51p and the arrangement of the protruding portions 51p. Depending on the formation state of the flow path, a smoother flow of the resin can be created.

Here, as shown in the inset circled by the dotted line in FIG. 4, it has already been described that the positioning portion 512 provided in each of the end surface connecting members 51 is formed to have an L-shape. This L-shaped bent portion plays a role similar to that of a barb (Barb) of a fish hook, and improves the joining strength between each end surface connecting member 51 and the corresponding resin-molded portion 6A, 6B.

Finally, the resin that has been filled in the mold is hardened, and thus, the reactor 1a in FIG. 1 can be completed. The hardened resin constitutes the resin-molded portions 6A and 6B.

Effects

The reactor 1a of the present embodiment that has been described above stably exhibits desired magnetic characteristics. Since the resin-molded portions 6A and 6B enter the gaps formed by the end surfaces of the outer core portions 32 with the outer surfaces of the respective end surface connecting members 51 as well as the gaps formed by the end surfaces of the outer core portions 32 with the end surfaces of the respective inner core portions 31, almost no unwanted air gap is formed in these gaps. The reason that almost no air gap is formed in these gaps is because, as a result of the outer core portions 32 being separated from the outer surfaces of the respective end surface connecting members 51 by the protruding portions 51p formed in the end surface connecting members 51, the resin easily flows into the gaps between the outer core portions 32 and the respective end surface connecting members 51 during integration of the outer core portions 32 and the end surface connecting members 51 by the resin-molded portions 6A and 6B (see FIG. 6 and the explanation thereof). In addition, since almost no gap is formed between the members 32 and 51 and between the members 32 and 31, the members 32 and 51 are securely integrated, and the members 32 and 31 are securely integrated, so that backlash between the members 31, 32, and 51 of the reactor 1a and vibrations that are caused by an air gap are suppressed.

Moreover, in the reactor 1a of the present embodiment, the assembly 1 is adopted in which the coil 2 and the inner core portions 31 are integrated by the coil covers 4A and 4B, and therefore the reactor 1a of the present embodiment has excellent productivity. This is because the assembly 1 into which the coil 2, the inner core portions 31, and the coil covers 4A and 4B are integrated can be easily produced by simply fitting the coil covers 4A and 4B to the respective winding portions 2A and 2B and mechanically engaging the coil covers 4A and 4B with the end surface connecting members 51. In some cases, the assembly 1 can be produced without using an adhesive.

In the reactor 1a of the present embodiment in which the assembly 1 is used, the inner core portions 31 are accurately positioned relative to the winding portions 2A and 2B by the coil covers 4A and 4B, and furthermore, the relative positional relationship between each of the winding portions 2A and 2B and the corresponding inner core portion 31 is maintained by the coil covers 4A and 4B. Thus, a step of positioning the inner core portions 31 and the winding portions 2A and 2B in an appropriate arrangement while maintaining the insulation of the inner core portions 31 from the winding portions 2A and 2B can be realized without the necessity for an adhesive, and accordingly the assembly 1 can be easily produced. Moreover, rubbing of each inner core portion 31 against the inner circumferential surface of the corresponding one of the winding portions 2A and 2B when vibrations of the vehicle are transmitted to the reactor 1a, and resulting damage to the winding portions 2A and 2B can be suppressed. In addition, since the outer core portions 32 are integrated with the respective end surface connecting members 51 by the resin-molded portions 6A and 6B, all of the members constituting the reactor 1a are securely connected together. For this reason, backlash and vibrations of the members of the reactor 1a are effectively suppressed.

The reactor 1a of the present embodiment can be installed and used on the installation target while remaining in the assembled state shown in FIG. 1, without the necessity of being accommodated in a case and embedded in a potting resin or the necessity of being entirely molded with a resin. The reason for this is that the various members constituting the reactor 1a are firmly combined together and are prevented from coming apart. In this reactor 1a, the coil 2 and the like are in a bare state, and thus, when the reactor 1a is used in a state in which it is immersed in, for example, a liquid refrigerant or the like, the reactor 1a can be efficiently cooled. Consequently, the occurrence of a situation in which the operation of the reactor 1a becomes unstable due to heat can be suppressed. It should be noted that the orientation in which the reactor 1a is installed is not limited, and the lower surface (surface on the lower side of the paper plane) of the reactor 1a may be placed on the installation target, or a surface other than the lower surface may be placed on the installation target.

Modification 1-1

In Embodiment 1, as shown in FIG. 3, the engagement protrusions 4p are formed in the coil covers 4A and 4B, and the engagement holes 5h are formed in the end surface connecting members 51. Conversely, it is also possible to form engagement holes in the coil covers 4A and 4B and form engagement protrusions in the end surface connecting members 51.

Modification 1-2

In Embodiment 1, an engagement direction (direction in which the engagement protrusions 4p are inserted into the engagement holes 5h) is the same direction as the axial direction of the winding portions 2A and 2B; however, the engagement direction is not limited to this direction. For example, a configuration may also be adopted in which the engagement direction is set in a direction in which the winding portions 2A and 2B are arranged side-by-side. A specific example of this configuration can be described using FIG. 3 as follows: engagement holes are formed at positions in the outer surfaces of the core coating portions 52 (corresponding to inner connecting members) that are in proximity to the respective end surface connecting members 51, and engagement protrusions protruding inward are formed at positions in the L-shaped frame portions of the coil covers 4A and 4B. In the case where this form is employed, the coil covers 4A and 4B can be attached to the respective winding portions 2A and 2B after the core components 3A and 3B are assembled to the coil 2.

Modification 1-3

The mechanical engagement of the coil covers 4A and 4B with the end surface connecting members 51 or the mechanical engagement of the coil covers 4A and 4B with the inner connecting members of Modification 1-2 is not limited to press-fitting of the engagement protrusions 4p into the corresponding engagement holes 5h. For example, a snap-fit structure constituted by an engagement protrusion having a barb (Barb) at a leading end and an engagement hole in which the barb can be hooked or other structures can be used.

Modification 1-4

In Embodiment 1, an example in which the comb teeth 4c are formed on the inner circumferential surfaces of the coil covers 4A and 4B in advance has been described. In contrast, the coil covers 4A and 4B without comb teeth may be fitted to the outer circumferential surfaces of the respective winding portions 2A and 2B. Furthermore, a portion of the coil covers 4A and 4B may be melted by heating the coil covers 4A and 4B so that the resultant melt enters between the turns of the winding portions 2A and 2B. In that case, at least those portions of the coil covers 4A and 4B that oppose the respective winding portions 2A and 2B are composed of a thermoplastic resin. That is to say, this configuration corresponds to a configuration in which the comb teeth 4c are formed after the coil covers 4A and 4B are fitted to the respective winding portions 2A and 2B.

Embodiment 2

In Embodiment 1, a configuration in which the resin-molded portions 6A and 6B extend only to the end surface connecting members 51 as shown in FIG. 1 has been described. In contrast, the resin-molded portions 6A and 6B may extend even to the coil 2 or the coil covers 4A and 4B. It goes without saying that the resin-molded portions 6A and 6B may also cover the entire assembly 1.

In the case of a configuration in which the resin-molded portions 6A and 6B cover portions extending beyond the end surface connecting members 51, the coil 2 and the inner core portions 31 need not be used in the form of the assembly 1. For example, with respect to the configuration shown in FIG. 2, it is sufficient if the members excluding the coil covers 4A and 4B are arranged in the mold and are entirely molded with a resin.

Embodiment 3

The reactor according to the embodiments can be preferably applied to uses where the energization conditions are, for example, maximum current (direct current): about 100 A to 1000 A, average voltage: about 100 V to 1000 V, and working frequency: about 5 kHz to 100 kHz, and typically for a constituent component of an in-vehicle power conversion device installed in an electric automobile, a hybrid automobile, or the like. For these uses, it is expected that a reactor that satisfies the requirements that the inductance when the flowing direct current is 0 A is between 10 µH and 2 mH inclusive, and the inductance when a maximum current flows is 10% or more of the inductance at 0 A can be preferably used. Hereinafter, an example in which the reactor 1 of the embodiments is applied to a power conversion device for use in vehicles will be briefly described with reference to FIGS. 7 and 8.

Figure 7:
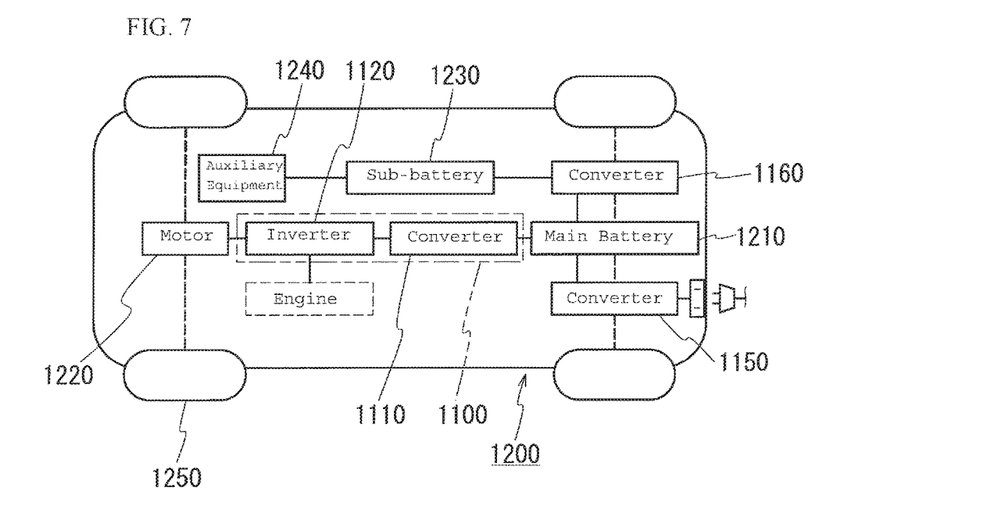
FIG. 7 is a schematic configuration diagram schematically illustrating a power supply system of a hybrid automobile.

For example, a vehicle 1200 such as a hybrid automobile or an electric automobile includes, as shown in FIG. 7, a main battery 1210, a power conversion device 1100 connected to the main battery 1210, and a motor (load) 1220 that is driven by power supplied from the main battery 1210 and that is used for travelling. The motor 1220, which may typically be a three-phase alternating current motor, drives wheels 1250 during travelling, and functions as a generator during regeneration. In the case of a hybrid automobile, the vehicle 1200 includes an engine in addition to the motor 1220. It should be noted that although FIG. 7 shows an inlet as a portion for charging the vehicle 1200, a configuration in which a plug is provided may also be adopted.

The power conversion device 1100 has a converter 1110 that is connected to the main battery 1210 and an inverter 1120 that is connected to the converter 1110 and that converts direct current to alternating current and vice versa. During travelling of the vehicle 1200, the converter 1110 shown in this example increases the direct current voltage (input voltage), about 200 V to 300 V, of the main battery 1210 to about 400 V to 700 V, thereby feeding power to the inverter 1120. Also, during regeneration, the converter 1110 decreases a direct current voltage (input voltage) output from the motor 1220 via the inverter 1120 to a direct current voltage suitable for the main battery 1210, thereby charging the main battery 1210. During travelling of the vehicle 1200, the inverter 1120 converts direct current whose voltage has been increased by the converter 1110 to a predetermined alternating current, thereby feeding power to the motor 1220, while during regeneration, the inverter 1120 converts an alternating current output from the motor 1220 to direct current and outputs the direct current to the converter 1110.

Figure 8:
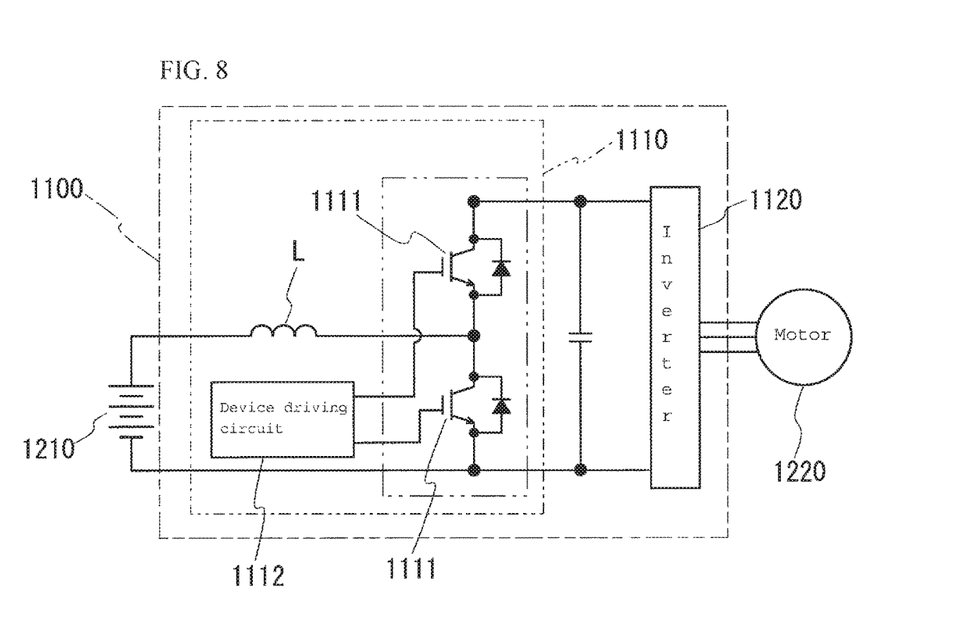
FIG. 8 is a schematic circuit diagram illustrating an example of a power conversion device including a converter.

The converter 1110 includes, as shown in FIG. 8, a plurality of switching elements 1111, a driving circuit 1112 that controls the operation of the switching elements 1111, and a reactor L, and converts an input voltage (here, increases and decreases the voltage) by repeatedly turning ON/OFF (switching operation). A power device such as a field-effect transistor (FET) or an insulated gate bipolar transistor (IGBT) may be used as the switching elements 1111. The reactor L utilizes the property of the coil inhibiting a change in current attempting to flow through the circuit, and has the function of smoothing any change in current when current is about to increase or decrease due to the switching operation. The reactor according to the above-described embodiments is used as this reactor L.

Here, the vehicle 1200 includes, in addition to the converter 1110, a converter 1150 for a power feeding device, the converter 1150 being connected to the main battery 1210, and a converter 1160 for an auxiliary equipment power supply, the converter 1160 being connected to a sub-battery 1230, which serves as a power source for auxiliary equipment 1240, and the main battery 1210 and converting a high voltage of the main battery 1210 to a low voltage. The converter 1110 typically performs DC-DC conversion, whereas the converter 1150 for the power feeding device and the converter 1160 for the auxiliary equipment power supply perform AC-DC conversion. There also are converters 1150 for the power feeding device that perform DC-DC conversion. A reactor having the same configuration as the reactor of the embodiments, with the size, shape, and the like of the reactor being changed as appropriate, can be used as reactors for the converter 1150 for the power feeding device and the converter 1160 for the auxiliary equipment power supply. Moreover, the reactor of the above-described embodiments can also be used for a converter that converts the input power and only increases or only decreases the voltage.

It should be noted that the present invention is not limited to the above-described embodiments, and changes can be made thereto as appropriate without departing from the gist of the present invention. For example, the configuration of the present invention is also applicable to a reactor having only a single winding portion.

INDUSTRIAL APPLICABILITY

A reactor of the present invention can be used for a constituent component of power conversion devices such as bidirectional DC-DC converters installed in vehicles such as hybrid automobiles, electric automobiles, and fuel-cell electric automobiles. 図面の訳
FIG. 7
1110 Converter
1120 Inverter
1150 Converter
1160 Converter
1210 Main battery
1220 Motor
1230 Sub-battery
1240 Auxiliary equipment
エンジン Engine
FIG. 8
1112 Device driving circuit
1120 Inverter
1220 Motor

The invention claimed is:

1. A reactor comprising:
a coil having a winding portion;
a magnetic core having an inner core portion disposed inside the winding portion and an outer core portion disposed outside the winding portion, the outer core portion having an inner surface facing the inner core portion, wherein the inner surface is planar;
an end surface connecting member that is disposed between an end surface of the winding portion and the outer core portion, the end surface connecting member being a planar plate;
a resin-molded portion that integrates the outer core portion and the end surface connecting member; and
a plurality of protruding portions disposed on an outer surface of the end surface connecting member the outer surface facing the inner surface of the outer core portion, the plurality of protruding portions engaging the inner surface of the outer core portion so as to create a gap between the outer surface of the end surface connecting member and the inner surface of the outer core portion,
wherein the resin-molded portion enters the gap between the outer surface of the end surface connecting member and inner surface of the outer core portion so as to couple the end surface connecting member to the outer core.

2. The reactor according to claim 1,
wherein the end surface connecting member includes an accommodation space in the outer surface, the accommodation space accommodating a portion of an end portion of the outer core portion, and the plurality of protruding portions are arranged in the accommodation space in a distributed manner, and
a flow path for the resin-molded portion is formed between the protruding portions that are arranged in the distributed manner.

3. The reactor according to claim 2, wherein the end surface connecting member includes a positioning portion that defines a position at which the outer core portion is attached to the end surface connecting member.

4. The reactor according to claim 2, wherein the coil has a pair of said winding portions that are arranged side-by-side,
the magnetic core is a ring-shaped core having a pair of said inner core portions that are disposed inside the respective winding portions and a pair of said outer core portions that are disposed at opposite end portions of the inner core portions,
a plurality of said end surface connecting members are provided, each being disposed between a respective end surface of the pair of winding portions and one of the outer core portions, and
a pair of core components are provided in each of which one of the end surface connecting members is integrally molded with the end portion of a corresponding one of the inner core portions by resin coating.

5. The reactor according to claim 2, further comprising:
a coil cover that is fixed to the winding portion by being fitted to an outer circumferential surface of the winding portion,
wherein the end surface connecting member is positioned relative to the inner core portion by being fixed to the inner core portion, and the coil cover and the end surface connecting member are engaged with each other.

6. The reactor according to claim 1,
wherein the end surface connecting member includes a positioning portion that defines a position at which the outer core portion is attached to the end surface connecting member.

7. The reactor according to claim 6, wherein the coil has a pair of said winding portions that are arranged side-by-side,
the magnetic core is a ring-shaped core having a pair of said inner core portions that are disposed inside the respective winding portions and a pair of said outer core portions that are disposed at opposite end portions of the inner core portions,
a plurality of said end surface connecting members are provided, each being disposed between a respective end surface of the pair of winding portions and one of the outer core portions, and a pair of core components are provided in each of which one of the end surface connecting members is integrally molded with the end portion of a corresponding one of the inner core portions by resin coating.

8. The reactor according to claim 6, further comprising:
a coil cover that is fixed to the winding portion by being fitted to an outer circumferential surface of the winding portion,
wherein the end surface connecting member is positioned relative to the inner core portion by being fixed to the inner core portion, and the coil cover and the end surface connecting member are engaged with each other.

9. The reactor according to claim 1,
wherein the coil has a pair of said winding portions that are arranged side-by-side,
the magnetic core is a ring-shaped core having a pair of said inner core portions that are disposed inside the respective winding portions and a pair of said outer core portions that are disposed at opposite end portions of the inner core portions,
a plurality of said end surface connecting members are provided, each being disposed between a respective end surface of the pair of winding portions and one of the outer core portions, and
a pair of core components are provided in each of which one of the end surface connecting members is integrally molded with the end portion of a corresponding one of the inner core portions by resin coating.

10. The reactor according to claim 9, further comprising:
a coil cover that is fixed to the winding portion by being fitted to an outer circumferential surface of the winding portion,
wherein the end surface connecting member is positioned relative to the inner core portion by being fixed to the inner core portion, and the coil cover and the end surface connecting member are engaged with each other.

11. The reactor according to claim 1, further comprising:
a coil cover that is fixed to the winding portion by being fitted to an outer circumferential surface of the winding portion,
wherein the end surface connecting member is positioned relative to the inner core portion by being fixed to the inner core portion, and the coil cover and the end surface connecting member are engaged with each other.

12. The reactor according to claim 11,
wherein one of the coil cover and the end surface connecting member includes an engagement protrusion, and the other of the coil cover and the end surface connecting member includes an engagement hole that corresponds to the engagement protrusion, and
the coil cover and the end surface connecting member are engaged with each other by the engagement protrusion being fitted into the engagement hole.

\* \* \* \* \*